UNITED STATES PATENT OFFICE.

EDWARD E. LING, OF SCARBOROUGH, MAINE.

OIL SOLVENT.

SPECIFICATION forming part of Letters Patent No. 507,586, dated October 31, 1893.

Application filed October 24, 1892. Serial No. 449,862. (No specimens.)

*To all whom it may concern:*

Be it known that I, EDWARD E. LING, a citizen of the United States, residing at Scarborough, in the county of Cumberland and State of Maine, have invented certain new and useful Improvements in Oil Solvents; and I do hereby declare the following to be a full, clear, and exact description of the invention, such as will enable others skilled in the art to which it appertains to make and use the same.

My invention relates to improvements in oil solvents for removing paint, varnish, shellac, &c., from wood, tin, glass and other similar articles.

It consists in the combination of the following articles, to wit: a compound of sodium, lime and glycerine to which may be added a deodorizer, which may be an essential oil. These ingredients are combined in substantially the following manner. The compound of sodium is dissolved and the lime slaked separately and then thoroughly mixed together. After they have become cool the glycerine is added and also an essential oil may added, but the latter is not necessary. The mass thus produced is then reduced by mechanical means to the required degree of fineness and brought to the consistency of a pasty mass by the addition of water, if necessary. It has been found by varied experiment that sal-soda is specially adapted for this use and also that better results can be secured by dissolving the compound of sodium and slaking the lime in warm water. The proportions of these several articles may be varied to a considerable extent and I do not wish to limit myself to any particular proportion of the articles used, nor to any particular degree of heat in the water used to dissolve the compound of sodium nor to the use of any essential oil.

To use my oil solvent, apply with a suitable implement a thick coat of the composition to the article to be treated, covering the surface well. Allow it to remain until the old paint, varnish, &c., underneath it is thoroughly dissolved. The time necessary to accomplish this result will depend on the condition of said paint, &c. The older and drier the paint the longer it will be necessary for the solvent to remain upon it. When the paint has become thoroughly dissolved the whole may be washed off and after it has been dried it will readily take a new coat of paint.

The advantages of this preparation are that the paint can be quickly and completely removed without injury to the material and that it may be applied by any one even without previous experience. Another important advantage of this preparation is that it remains moist for a long time and yet does not penetrate the material so that larger quantities of the preparation may be used and yet as soon as it is washed off and the external surface of the article dried it is ready to take a new coat of paint.

Having thus described my invention and its use, I claim—

1. A new composition of matter for removing paint, varnish and similar substances, composed of a compound of sodium, lime and glycerine, substantially as and for the purposes set forth.

2. A new composition of matter for removing paint varnish and similar substances, composed of sal-soda, lime and glycerine substantially as and for the purposes set forth.

3. A new composition of matter for removing paint, varnish and similar substances, composed of a compound of sodium, an essential oil, lime and glycerine, substantially as and for the purposes set forth.

4. The herein described process of manufacturing oil solvents which consists in dissolving a compound of sodium in water, slaking lime in water, mixing these two ingredients together, and after the compound has become cold, adding glycerine, substantially as and for the purposes set forth.

In testimony whereof I affix my signature in presence of two witnesses.

EDWARD E. LING.

Witnesses:
ELGIN C. VERRILL,
NATHAN CLIFFORD.